(No Model.)

C. S. DODGE.
SHODDY PICKER.

No. 287,108. Patented Oct. 23, 1883.

WITNESSES
Wm A. Skinkle.
Alfred C. Newman.

INVENTOR
Charles S. Dodge.
By his Attorneys
Baldwin, Hopkins & Peyton.

UNITED STATES PATENT OFFICE.

CHARLES S. DODGE, OF LOWELL, MASSACHUSETTS.

SHODDY-PICKER.

SPECIFICATION forming part of Letters Patent No. 287,108, dated October 23, 1883.

Application filed June 21, 1883. (No model.)

*To all whom it may concern:*

Be it known that I, CHARLES S. DODGE, a citizen of the United States, residing at Lowell, in the county of Middlesex and Commonwealth of Massachusetts, have invented certain new and useful Improvements in Shoddy-Pickers, of which the following is a specification.

My invention consists in an improved form of pin or picker, which is to be secured in a suitable lag and mounted on the cylinder of a shoddy-picker, as will be well understood by those skilled in such matters.

The purpose of my invention is to devise a picker which will act upon the material in a most efficient manner with a minimum driving-power. With this object in view I have devised a picker possessing peculiarities of structure and operation, which are fully set forth below. Before proceeding to a description of my invention, however, I desire to state that I am aware that flat pickers are old, and that round tapering pickers formed with round or square shanks to secure them in the lag are also old; and I do not desire, therefore, to be understood as including such devices within the scope of my invention.

Figure 1:
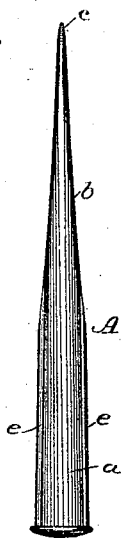
Figure 2:
Figure 3:
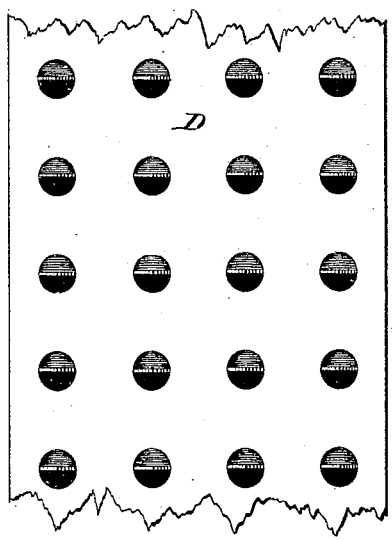

In the accompanying drawings, Figure 1 is an elevation of my improved picker, looking at the edge of its blade; Fig. 2, a side view of the same, and Fig. 3 a plan view of a portion of a lag with pickers arranged therein.

The picker A is preferably formed with a head, and has a shank, $a$, which may be either round or square, but which in this instance is represented as being round. The blade $b$ of the picker, or that part which projects from the lag and operates upon the material, is formed by "hollow" or concave inclines, which extend from the shank of the picker to its point. The faces of these hollow or concave inclines are preferably convex on transverse lines, as is illustrated by the black lines in Fig. 1 and the shading in Fig. 2. By such a construction, the pin, as it wears from contact with the material operated upon, will approximately retain its shape and edge, and can be driven through the material with a minimum driving-power, cutting and tearing it in the most efficient manner. In order to still further improve the operation of the pin, I form it with a diamond point, $c$, as clearly shown in the drawings. As is well understood by those familiar with this class of machines, the picker-pins are secured in the lags D by being forcibly driven into apertures therein. In order to firmly secure the pins in the lags and hold them positively against turning, so that the edges of their blades will always be presented to the material in the proper manner, I form feathers or ribs $e$ on the shank of the pin. When the pin is driven into the aperture in the lag, these feathers take a firm hold in the sides of the aperture and hold the pin. In addition to this important function, however, there is another of equal importance. As in practice pickers are often subjected to very severe strains, and as, in order to do efficient work, they must be made comparatively thin, there is a tendency for the blade of the picker to bend about where the hollow inclines run out on the shank, or at or about the point where the picker emerges from the face of the lag. The ribs $e$ re-enforce the picker at this point and prevent the bending of the blade.

I prefer to make the pins with hollow inclines, as such a construction, in my opinion, gives the best results; but pins having feathered shanks and blades formed by straight inclines are obviously included in the scope of my invention.

So far as I am aware, I am also the first to use a wedge-shaped pin in combination with a picker-cylinder lag, and such an organization possesses material advantages.

Having thus described my invention, what I claim is—

1. A picker-pin having a cutting or tearing blade the faces of which are formed by concave inclines, substantially as set forth.

2. The improved picker having a cutting or tearing blade the broad faces of which are formed longitudinally by concave inclines, but are convex on transverse lines, substantially as set forth.

3. The herein-described picker having a shank provided with feathers or flanges, and a cutting or tearing blade formed by inclined faces.

4. The improved picker herein described, having a shank provided with feathers or ribs, and a diamond-pointed cutting or tearing blade the broad faces of which are formed longitudinally by inclined faces, but are convex on transverse lines.

5. The combination, substantially as set forth, of a picker-cylinder lag with a series of picker-pins having feathered or ribbed shanks, and cutting or tearing blades the faces of which are formed by inclined faces.

6. The combination, substantially as set forth, of a picker-cylinder lag and a wedge-shaped picker.

In testimony whereof I have hereunto subscribed my name this 18th day of June, A. D. 1883.

CHARLES S. DODGE.

Witnesses:
EDWARD BROWN,
DANIEL MURPHY.